United States Patent [19]

Lankard

[11] 4,366,255
[45] Dec. 28, 1982

[54] HIGHLY REINFORCED REFRACTORY CONCRETE WITH 4-20 VOLUME % STEEL FIBERS

[75] Inventor: David R. Lankard, Columbus, Ohio

[73] Assignee: Wahl Refractory Products, Company, Fremont, Ohio

[21] Appl. No.: 246,507

[22] Filed: Mar. 23, 1981

[51] Int. Cl.$^3$ ............................................. C04B 35/02
[52] U.S. Cl. ........................................ 501/95; 106/84; 106/85; 106/104; 106/109; 428/703; 501/124; 501/125; 501/127; 501/128
[58] Field of Search ...................... 501/95, 124; 106/99

[56] References Cited

U.S. PATENT DOCUMENTS 4,208,214 6/1980 Stein et al. ............................ 501/95

OTHER PUBLICATIONS

Lankard, D. R. et al., Bull Am. Cer. Soc. 50 (5) 1971, "Use of Steel Wire Fibers in Refractory Castables", pp. 497–500.

Hewlett, P. et al., ACI Journal, May 1977, "Superplasticized Concrete", pp. N6–N11.
Haynes, H. H., "Investigation of Fiber Reinforcement Methods for Thin Shell Concrete", Tech. Note N-979, Naval Civil Eng. Lab., Port Hueneme, Ca., Sep. 1968.
Kiesler, R. E., *Concrete Construction*, "Flowing Concrete", Jan. 1979, pp. 25–27.
Bache, H. H., Published Int'l Patent Appl'n WO80/00959, May 15, 1980.

*Primary Examiner*—Helen M. McCarthy
*Attorney, Agent, or Firm*—Biebel, French & Nauman

[57] ABSTRACT

A highly reinforced refractory is disclosed. In accordance with the invention higher reinforcement of refractory shapes such as plunging bells or injection lances is achieved by infiltrating a bed of metal fibers in a mold with an aqueous slurry of a refractory material containing a superplasticizer. Refractory Concrete comprises e.g. calcium aluminate cement, alumina aggregate of 35 mesh or less maximum particle size, sulfonated naphthalene formaldhyde as superplasticizer and greater than 4 volume % metal (steel) fibers.

12 Claims, No Drawings

4,366,255

HIGHLY REINFORCED REFRACTORY CONCRETE WITH 4-20 VOLUME % STEEL FIBERS

BACKGROUND OF THE INVENTION

The present invention relates to reinforced refractories and more particularly to refractory compositions reinforced with higher amounts of metal fibers than previously possible.

Fiber reinforcement has been used for some time to improve tensile strength and the overall stress absorption capabilities of concretes. A synopsis of its development and study is provided by Haynes, H. H. "Investigation of Fiber Reinforcement of Thin Shell Concrete", Technical Note N-979. Naval Civil Engineering Laboratory, Port Hueneme, Calif., September, 1968. As background, Haynes outlines a number of studies concerning the fiber, its dimension and spacing in the field of concrete and mortar reinforcement.

The primary function of steel fibers in concrete is to inhibit the initiation and propagation of cracks in the concrete matrix. The effectiveness of these cracks arresters increases as the amount of fiber in the concrete increases. However, in instances where the fibers are added to the concrete during the mixing operation, the fiber loading has been limited to a maximum of about 2 volume percent due to difficulties experienced in mixing, handling, placing and consolidating concretes containing large numbers of fibers.

A method is disclosed in U.S. application Ser. No. 180,688 filed Aug. 25, 1980, now U.S. Pat. No. 4,339,289, for overlaying reinforced concrete in making repairs of roadways, bridge decks and the like in which a 1½ inch thick bed of steel fibers is placed on the substratum with a bonding agent and infiltrated with a cement composition which may contain a superplasticizing agent. Using this procedure fiber loadings of 4 to 12% by volume have been possible in the thin layer of overlaying concrete.

Steel fibers have also been used in the reinforcement of refractory concretes (so-called castables), plastics and ramming mixtures. Typically they have not been used in amounts greater than 2% by volume for practical reasons. With amounts greater than 2% it has been difficult if not impossible to place and consolidate the fiber-containing refractory material into forms, molds, etc. While substantial improvements in service life have been achieved with fiber additions as low as 0.5 to 2.0%, the ultimate potential of fiber reinforcement in refractory materials has not been realized. This situation is dramatically illustrated by FIG. 1 of Romualdi, U.S. Pat. No. 3,429,094 directed to steel fiber reinforced concrete. This graph shows the effect of the spacing between fibers (in the concrete) on the strength ratio (fiber reinforced concrete/same concrete without fibers). It is seen that the experimental data points do not fall much below a fiber spacing of 0.1 inches. As discussed, this is related to the inability to mix, place and consolidate concretes containing high amounts of fibers. Thus, strength ratios of only 2.5 to 2.75 are attained. However, the non-linear nature of the strength ratio/spacing relationship promises much higher strength ratios at even smaller fiber spacings (i.e., below 0.1). These lower fiber spacings can, in theory, be obtained by incorporating larger amounts of fibers into the concrete. However, previously there existed no adequate system for doing so. Thus a need exists for a technique able to introduce higher amounts of steel fibers into a refractory composition resulting in heretofore unattainable increases in strength which will significantly increase the service life of these refractory products.

SUMMARY OF THE INVENTION

A principal object of the present invention is to provide a highly reinforced refractory.

Another object of the present invention is to provide a highly reinforced refractory containing greater than 4% by volume metal fiber.

Still another object of the invention is to provide highly reinforced refractory shapes such as plunging bells and injection lances which possess much longer service life.

A further object of the present invention is to provide a process for manufacturing such highly reinforced refractories.

These and other objects are attained in accordance with the present invention in which refractories reinforced with greater than 4% by volume metal fiber are possible.

Refractory shapes are made in accordance with the invention by infiltrating a bed of metal fibers provided in a mold with an aqueous slurry of a refractory material containing a superplasticizer. External vibration of the mold is used to promote flow of the fluent refractory material through the bed of metal fibers. The high fiber loadings possible in the present invention yield substantial improvements in flexural strength, impact strength and resistance to spalling. To date, refractory shapes manufactured pursuant to the invention have shown up to 4 times longer service life.

DETAILED DESCRIPTION OF THE INVENTION

Refractory concretes are heat-resistant concretes usually made with a calcium aluminate cement and a refractory aggregate. Aluminum-phosphate cement, gypsum and sodium silicate can also be used as the binder in these concretes. The refractory aggregate may be calcined mullite, kyanite, bauxite, and kaolin, among others. The refractory aggregate used in the present invention has a maximum particle size of about 35 mesh and is preferably 48 mesh or less. The maximum aggregate size is in fact dictated by the minimum spacing between the steel fibers. The refractory concrete is formulated such that it remains fluid about one-half hour to one hour. In general these concretes are capable of withstanding temperatures up to 1620° C.

A variety of fibers and fiber sizes can be used to reinforce the aforementioned refractory concretes in the present invention. Some fibers will give better results than others. Naturally, the fibers must be stable under refractory conditions. Stainless steel fibers are preferred for many purposes. Carbon steel and other metal fibers can also be used. A pre-matted metal wool may be suitable in some applications. In general, the metal fibers may range in length from about ¾ to 2.0 inch, have a diameter of from about 10 to 30 mils and possess an aspect ratio (length/diameter) greater than 50. Fibers outside this range can be used if care is taken to prevent local fiber-deficient pockets from occurring when placing the fibers in the mold.

In accordance with the present invention it is possible to incorporate much higher amounts of metal fiber in a refractory than was previously possible. Refractories in the present invention contain metal fiber in an amount greater than 4% by volume, preferably in an amount of about 4 to 20% by volume, and more preferably in an amount greater than 8%, for example, 8% to 14% by volume.

In the method used to achieve these higher amounts of fiber, a superplasticizing agent is added to the slurry of the refractory material to better enable it to infiltrate the fibers and fill the mold. Superplasticizing agents are known and have been used in flowing concrete and water-reduced, high strength concrete, but have not previously, to my knowledge, been used with refractory materials. See for example "Superplasticized Concrete", *ACI Journal,* May, 1977, pp. N6-N11 and "Flowing Concrete", *Concrete Constr.,* Jan., 1979 (pp. 25-27). The most common superplasticizers are sulfonated melamine formaldehyde and sulfonated naphthalene formaldehyde. The superplasticizers used in the present invention are those which enable the aqueous refractory slurry to fully infiltrate the packed fibers. Of those plasticizers that are commercially available, Mighty 150, a sulfonated naphthalene formaldehyde available from ICI is preferred.

Some typical refractory concrete slurries useful in the present invention are illustrated in the table below.

TABLE

| | Weight % |
|---|---|
| Example 1 | |
| 100 mesh calcined bauxite/kaolin | 40 |
| CA-25 calcium aluminate cement | 40 |
| Water (containing 1.15 v/o Mighty 150) | 20 |
| Example 2 | |
| 100 mesh calcined mullite | 40 |
| CA-25 calcium aluminate cement | 40 |
| Water (containing 1.15 v/o Mighty 150) | 20 |
| Example 3 | |
| 60 mesh tabular alumina | 24 |
| 100 mesh calcined mullite | 24 |
| 48 mesh kyanite | 8 |
| Water (containing 1.15 v/o Mighty 150) | 21 |
| CA-25 calcium aluminate cement | 23 |

Refractory shapes are manufactured by preparing an aqueous slurry of a refractory concrete containing a superplasticizer and pouring it onto a bed of metal fibers in a mold while vibrating the mold. The refractory material is then allowed to harden, after which it is removed from the mold and dried to remove free and combined water.

The aqueous slurry is prepared by first mixing the refractory materials with the water and then, as a final mixing step, adding the superplasticizer. This mixing sequence has been found to produce the optimum fluidity when using the superplasticizers. The fluidity of the slurry must be such that it fully infiltrates the packed fiber bed using available forms of external vibration. In general, the water/cement ratios of the concretes used in the present invention will range from 0.5 to 0.8 by weight depending on the particle size gradation of the refractory mix and the cement content.

Vibration is conducted in any convenient manner. It may be accomplished manually or using mechanical vibrators, several types of which are readily available. Generally, the vibrator used is a low frequency one and vibration is continued after adding the slurry to the mold. The duration of this treatment to achieve full infiltration varies with the geometry of the mold and the fluidity of the slurry. No disadvantage has been observed by over-vibrating.

For typical refractory concrete compositions, hardening occurs overnight. After the refractory has set, it is removed from the mold and dried to remove free and combined water. Drying is preferably at 100° to 650° C.

Refractory shapes prepared with the aforementioned amount of fibers possess improved flexural and impact strength, and resistance to spalling. As a result, shapes such as plunging bells, have a much longer service life and greatly improved characteristics. For example, the improvement in flexural strength enjoyed with the present invention has ranged from an improvement of 100 to 800 percent compared to a 2% steel fiber reinforced refractory. There has been up to 100 fold increase in impact strength and the shapes that have been produced are essentially non-spalling. Plunging bells manufactured in accordance with the invention have lasted over 29 heats compared to 7 to 8 heats for a bell containing 1% fiber.

In addition to making plunging bells, the present invention can also be used in making injection lances and pier blocks, all for use in the steel industry where resistance to thermal stress and shock, spalling and cracking and improved durability and strength are important. Other types of pre-cast refractory shapes, where high fiber reinforcement is desirable, may also be made by the present invention.

While the invention has been described in detail with reference to specific embodiments thereof, it will be apparent to those skilled in the art that numerous variations and modifications thereof are possible without departing from the spirit and scope of the following claims.

What is claimed is:

1. A refractory shape comprising a refractory concrete reinforced with greater than about 4% by volume of metal fibers said concrete containing a refractory aggregate having a maximum particle size of about 35 mesh or less.

2. The refractory shape of claim 1 wherein said metal fibers are steel.

3. The refractory shape of claim 2 wherein said steel fibers are present in an amount of about 8-14% by volume.

4. The refractory shape of claim 3 wherein said metal fibers have a diameter of approximately 10-30 mil.

5. The refractory shape of claim 4 wherein said metal fibers have an aspect ratio of 50 or more.

6. The refractory shape of claim 1 wherein said shapes are plunging bells or injection lances or pier blocks.

7. A process for reinforcing a refractory shape which comprises:
   (a) preparing an aqueous slurry of a refractory concrete containing refractory aggregate having a maximum particle size of 35 mesh or less and a superplasticizer,
   (b) placing a bed of metal fibers in a mold, wherein said bed of metal fiber is about 4 to 20% by volume of said mold,
   (c) adding said slurry to said fibers while vibrating the mold such that said refractory concrete fills said mold and uniformly infiltrates said bed of metal fibers,
   (d) allowing said refractory concrete to harden, and
   (e) drying the refractory shape obtained.

8. The process of claim 7 wherein said fibers are steel fibers.

9. The process of claim 8 wherein said fibers have a diameter of about 10–30 mil.

10. The process of claim 7 wherein said superplasticizer is a sulfonated naphthalenic formaldehyde.

11. The refractory shape of claim 1 wherein said refractory aggregate has a maximum particle size of about 48 mesh or less.

12. The process of claim 7 wherein said aggregate has a particle size of about 48 mesh or less.

* * * * *